June 20, 1939.   F. M. GUY   2,162,811
COTTER PIN
Filed April 16, 1938
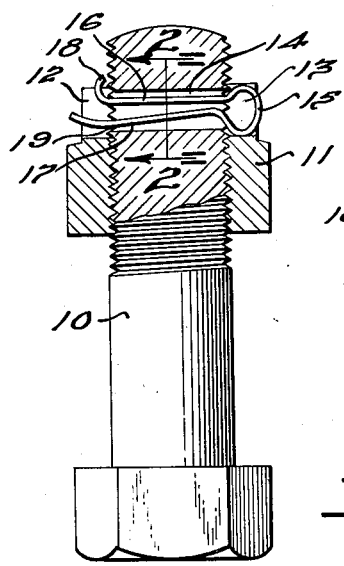
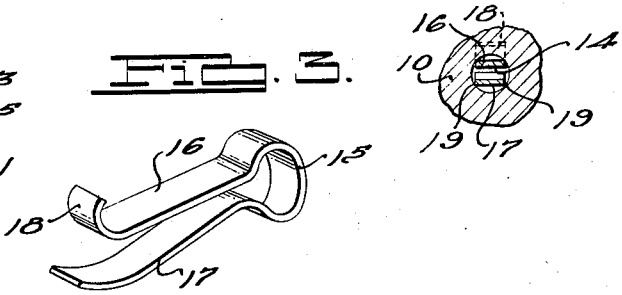
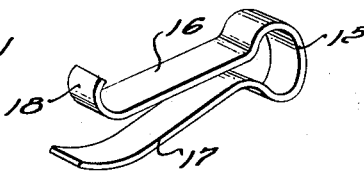
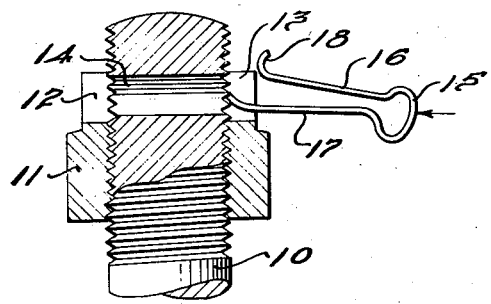
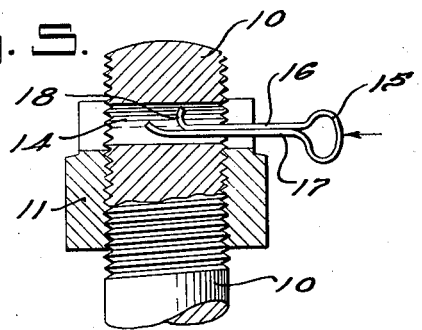
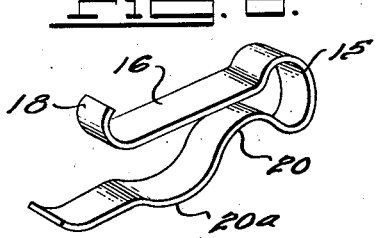
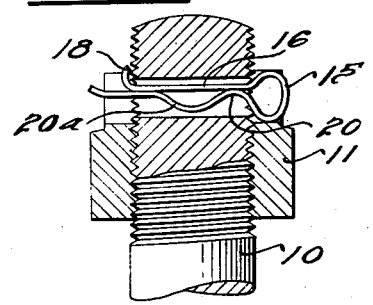
INVENTOR
Frederick M. Guy.
BY Dike, Calver & Gray
ATTORNEYS.

Patented June 20, 1939

2,162,811

UNITED STATES PATENT OFFICE 2,162,811

COTTER PIN

Frederick M. Guy, Detroit, Mich., assignor to Guy and Murton, Incorporated, Detroit, Mich., a corporation of Michigan Application April 16, 1938, Serial No. 202,476

3 Claims. (Cl. 85—8.5)

This invention relates to cotter pins and more particularly to cotter pins of the resilient type.

One of the objects of the present invention is to provide a cotter pin which can be easily inserted into a bolt hole and nut recess and which can be removed therefrom without breakage of the cotter pin.

A further object of the invention is to provide an improved cotter pin which is dependent principally upon friction for its operative engagement in the bolt hole and in which the shape and the size of the pin proper determines and controls the amount of frictional engagement, thereby ensuring proper placement of the pin in the bolt hole and the operative engagement of the pin with the nut.

A sill further object of the invention is to provide a cotter pin which presents a double cross section of the pin stock when in an operative position to withstand the shearing effort produced by the rotation of a loosening nut.

A still further object of the invention is to provide an improved cotter pin of the resilient type which is so retained in its operative engagement in a bolt hole that vibrations and relative movements of the nut and bolt do not produce rapid repeated bending of the pin and which therefore does not fatigue the metal or cause failures thereof.

It is an added object of the invention to provide an improved cotter pin which is very simple in construction, convenient to use and which is relatively inexpensive to manufacture.

Other objects of this invention will appear in the following description and appended claims, reference being had to the accompanying drawing forming a part of this specification wherein like reference characters designate corresponding parts in the several views.

Fig. 1 is a side view partly in section of a bolt having a castellated nut and provided with a cotter pin constructed in accordance with one embodiment of the invention, said cotter pin being shown in its operative position.

Fig. 2 is a fragmentary sectional view in the direction of the arrows, the section being taken on the line 2—2 of Fig. 1.

Fig. 3 shows in perspective the cotter pin of Fig. 1 removed from the bolt.

Fig. 4 is a view similar in part to Fig. 1, the cotter pin being shown in a position just before its insertion into the bolt hole.

Fig. 5 shows the relative positions of the parts of the pin when the same is being inserted into the bolt hole.

Fig. 6 shows in perspective a modified form of cotter pin embodying the present invention.

Fig. 7 is a fragmentary view partially in section showing the cotter pin of Fig. 6 in an operative position in a bolt hole.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there are shown, by way of example, three types of cotter pins embodying the present invention. In Fig. 1 there is illustrated a bolt 10 having a castellated nut 11 threaded thereon. The nut 11 is provided with a series of diametrically opposed recesses 12 and 13, while the bolt 10 is provided with a transverse passage or bolt hole 14 formed in the threaded portion of the bolt transversely thereof and adapted to register with a pair of the opposed recesses 12 and 13 of said nut 11. Inserted into said bolt hole there is shown one form of the cotter pin embodying the invention. As shown in Fig. 3, wherein said cotter pin is illustrated separately and in its free or uncompressed state, the cotter pin comprises a strip of resilient material, preferably a strip of spring steel of the like bent upon itself substantially at its middle to provide a loop 15 and two legs 16 and 17. The lower leg 17 is preferably formed with an upwardly inclined portion adjacent the end to facilitate ready insertion of the pin in a bolt hole. The loop 15 is substantially round and its diameter is larger than that of the hole 14, and therefore said loop forms, in fact, a head of the pin which cannot pass through the hole 14 and therefore serves as the stop or the head for the pin.

The upper leg 16, that is the one which is more remote from the bolt head than the leg 17, as shown in Fig. 1 has a turned up portion or end 18 provided thereon, the bend being of substantially 90 degrees. The size of the turned up end 18 is such that when the legs 16 and 17 are brought together, it can be easily passed through the bolt hole 14. As soon as the end 18 comes out from the other side of the hole 14, opening effort of the legs brings the upper extremity of the end 18 well above the hole, whereupon the removing of the pin by an application of an effort in a direction parallel to the axis of the bolt hole 14 becomes impossible unless the legs are brought together by compressing the pin.

In the operative position of the cotter pin illustrated in Fig. 1 the upper leg 16 is in contact with the walls of the hole 14 substantially throughout the entire length thereof, while the lower leg 17 contacts the hole only at the end thereof as indicated at 19. It should be noted that since a flat strip is used for making the cotter pin, only the edges thereof contact the side walls of the hole 14, and therefore in a sectional view taken substantially through the middle of the pin the cotter pin seems not to be in contact with the walls of the hole. An examination of Fig. 1 will clarify this construction.

In the modified structure shown in Figs. 6 and 7, the lower leg 20 is provided with a convex portion 20a adapted to provide additional points of contact of the pin with the walls of the hole 14 intermediate the ends thereof. The construction here shown utilizes a hooked end portion 18.

From an examination of the drawing it can be easily seen that the cotter pin embodying my invention is so retained in its operative engagement in a bolt hole that vibrations and relative movements of the nut and bolt do not impose any stresses on the pin and therefore do not produce rapid repeated bending of the pin and fatigues in the metal thereof. The construction of the pin proper is such that sharp bends are completely eliminated, and the breakage of the pin in handling or while in the bolt is unlikely.

Removal of the pin from the bolt hole can be achieved without the necessity of breaking the pin, and the same may be used repeatedly many times. In addition, breaking off of the ends of the pin, prevented in my cotter pin, is very undesirable, since the broken pieces may easily get between mating parts such as gears and cause breakage thereof, or they may get in valves and cause serious operation troubles.

I claim:

1. A cotter pin for insertion into a bolt hole of a bolt and nut device, said pin comprising a single flat strip of metal bent upon itself at its approximate middle to produce in said approximate middle a continuously curved loop substantially in the form of a circle of a larger diameter than that of the bolt hole into which the pin is intended to be inserted, said pin having two legs adapted to come together in relatively flatwise abutting relation when the pin is compressed and to open when the pin is released, one leg having a sharp hook-shaped end upturned away from the other leg for engagement with the threaded portion of the bolt, and said other leg having its free end extended beyond the first leg and being curved gradually in the general direction of the hook-shaped end of said first leg.

2. A cotter pin for insertion into a bolt hole of a bolt and nut device, said pin comprising a single flat strip of metal bent upon itself at its approximate middle to produce in said approximate middle a continuously curved loop substantially in the form of a circle of a larger diameter than that of the bolt hole into which the pin is intended to be inserted, said pin having two legs adapted to come together in relatively flatwise abutting relation when the pin is compressed and to open when the pin is released, one leg having a sharp hook-shaped end upturned away from the other leg for engagement with the nut and the threaded portion of the bolt, and said other leg having its free end extended beyond the first leg and being curved gradually in the general direction of the hook-shaped end of said first leg, said other leg engaging a wall of the bolt hole.

3. A cotter pin for insertion into a bolt hole of a bolt and nut device, said pin comprising a single flat strip of metal bent upon itself at its approximate middle to produce in said approximate middle a continuously curved loop substantially in the form of a circle of a larger diameter than that of the bolt hole into which the pin is intended to be inserted, said pin having two legs adapted to come together in relatively flatwise abutting relation when the pin is compressed and to open when the pin is released, the leg more remote from the bolt head having a sharp hook-shaped end upturned away from the other leg for engagement with the threaded portion of the bolt, said other leg having its free end extended beyond the first leg and having a gradual curvature in the general direction of the curvature of the hook-shaped end of said first leg, and said last named leg having intermediate its ends a portion bowed outwardly away from the first leg for engagement with a wall of the bolt hole.

FREDERICK M. GUY.